United States Patent Office 3,558,661
Patented Jan. 26, 1971

3,558,661
PROCESS FOR THE PRODUCTION OF 1,2,4-DITHIAZOLIDINES
Gerhard Zumach and Wolfgang Weiss, Cologne-Stammheim, and Engelbert Kühle, Bergisch Gladbach, Germany, assignors to Farbenfabriken Bayer Aktiengesellschaft, Leverkusen, Germany, a corporation of Germany
No Drawing. Continuation of application Ser. No. 550,939, May 18, 1966. This application Nov. 7, 1969, Ser. No. 871,552
Claims priority, application Germany, June 23, 1965, F 46,411
Int. Cl. C07d 87/46
U.S. Cl. 260—247.1                              5 Claims

ABSTRACT OF THE DISCLOSURE

A 1,2,4-dithiazolidine compound and process for producing compounds of the type by reacting chlorocarbonylsulphenyl chloride with an o-monothiocarbamate at a temperature of about 0–100° C. The resulting compounds are useful as insecticides.

---

This application is a continuation of application Ser. No. 550,939, as filed May 18, 1966, and now abandoned.

It has been found that novel 1,2,4-dithiazolidines are obtained if o-monothiocarbamates of the general formula

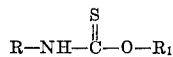

in which

R stands for hydrogen, an alkyl radical, which may be substituted by halogen atoms, alkoxy, aryl, aroxy, alkylmercapto or arylmercapto groups, an alkenyl radical or a dicarboxylic acid imino-methyl radical, an aryl radical, a cycloalkyl radical if desired substituted by halogen atoms, nitro, alkyl, alkoxy or alkylmercapto groups, or a heterocyclic radical, and $R_1$ represents a hydrocarbon radical, are reacted with chlorocarbonyl sulphene chloride, preferably in the presence of a solvent to form the 3,5-dioxo-1,2,4-dithiazolidines of the general formula

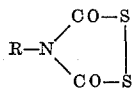

in which R has the meaning indicated above.

As alkyl radicals, which may be substituted, those having 1–20 carbon atoms are preferred, as alkenyl radicals those with 3–5 carbon atoms are preferred and, as cycloalkyl radicals those with 5–8 carbon atoms in the ring system are preferred; preferred aryl groups are phenyl and naphthyl preferred heterocyclic radicals those with 5–7 ring members and 1 to 3 hetero- atoms, such as oxygen, sulphur and nitrogen.

The following are examples of possible substituents:

Alkyl with 1 to 4 carbon atoms and alkoxy with 1 to 4 carbon atoms (wherein the total number of carbon atoms in R is preferably up to 20), phenyl or phenoxy radicals, halogen atoms (advantageously fluorine, chlorine and bromine), nitro groups, alkylmercapto radicals with 1 to 4 carbon atoms (wherein the total number of carbon atoms in R is preferably up to 20) and arylmercapto radicals, in particular the phenylmercapto radical.

$R_1$ is a hydrocarbon radical preferably with 1 to 18 carbon atoms. Preferred hydrocarbon radicals $R_1$ are aliphatic radicals; however, $R_1$ may further stand for a cycloaliphatic radical having 5- or 6-ring carbon atoms or for the benzyl-radical.

The o-monothiocarbamates used in the process are known. The following are examples of such compounds:

o-ethyl monothiocarbamate,
o-butyl-N-methyl monothiocarbamate,
o-ethyl-N-propyl monothiocarbamate,
o-methyl-N-dodecyl monothiocarbamate,
o-dodecyl-N-2-chlorethyl monothiocarbamate,
o-ethyl-N-2-bromethyl monothiocarbamate,
o-ethyl-N-3-methoxypropyl monothiocarbamate,
o-ethyl-N-2-isobutoxyethyl monothiocarbamate,
o-methyl-N-benzyl monothiocarbamate,
o-octyl-N-2-phenoxyethyl monothiocarbamate,
o-ethyl-N-2-butyl-mercaptoethyl monothiocarbamate,
o-butyl-N-2-phenyl-mercaptoethyl monothiocarbamate,
o-stearyl-N-allyl monothiocarbamate,
o-ethyl-N-cyclohexyl monothiocarbamate,
o-dodecyl-N-phenyl monothiocarbamate,
o-ethyl-N-4-bromophenyl monothiocarbamate,
o-methyl-N-3-nitrophenyl monothiocarbamate,
o-ethyl-N-4-methylphenyl monothiocarbamate,
o-ethyl-N-4-methoxy-phenyl monothiocarbamate,
o-butyl-N-4-trifluormethyl-phenyl monothiocarbamate,
o-methyl-N-3,4-dichlorophenyl monothiocarbamate,
o-ethyl-N-2-methyl-4-chlorophenyl monothiocarbamate,
o-cyclohexyl-N-2-chloro-4-nitrophenyl monothiocarbamate,
o-ethyl-N-1-naphthyl monothiocarbamate,
o-ethyl-N-1-morpholino monothiocarbamate,
o-ethyl-N-2-benthiazolyl monothiocarbamate,
o-butyl-N-3-(1,2,4-triazolyl)-monothiocarbamate,
o-ethyl-, o-propyl-, o-isobutyl- or o-dodecyl-N-phthalimidomethyl monothiocarbamates,
o-methyl-o-isopropyl or o-isooctyl-N-tetrahydrophthalimidomethyl monothiocarbamates,
o-methyl or o-ethyl-N-succinimidomethyl monothiocarbamates, and
o-ethyl or o-hexyl-N-α-methyl-succinimidomethyl monothiocarbamates.

Further monothiocarbamates include
o-butyl-N-4-chlorobutyl monothiocarbamate,
o-ethyl-N-2-cyclohexoxyethyl monothiocarbamate,
o-ethyl-N-10-propoxydecyl monothiocarbamate,
o-ethyl-N-phenylethyl monothiocarbamate,
o-ethyl-N-2-(2,4-dichlorophenoxy)-ethyl monothiocarbamate,
o-ethyl-N-2-(2,4-dichlorophenoxy)-propyl monothiocarbamate,
o-methyl-N-2-(2-methyl-4-chlorophenoxy)-ethyl monothiocarbamate,
o-butyl-N-2-(2,4,5-trichlorophenoxy)-ethyl monothiocarbamate,
o-ethyl-N-2-(4-chlorophenylmercapto)-ethyl monothiocarbamate,
o-ethyl-N-2-(4-tert.-butylphenylmercapto)-ethyl monothiocarbamate,
o-methyl-N-2,3-dichlorallyl monothiocarbamate,
o-ethyl-N-4-chlorocyclohexyl monothiocarbamate,
o-ethyl-N-2-methylcyclohexyl monothiocarbamate,
o-ethyl-N-3-trifluoromethylphenyl monothiocarbamate,
o-ethyl-N-3-chloro-4-methoxyphenyl monothiocarbamate,
o-ethyl-N-3-chloro-4-mercaptomethyl-phenyl monothiocarbamate,
o-ethyl-N-pentachlorophenyl monothiocarbamate,
o-ethyl-N-3-(N'-ethylcarbazolyl) monothiocarbamate,
o-ethyl-N-2-(N'-acetylpyrrolyl) monothiocarbamate,
o-ethyl-N-2-(benzimidazolyl) monothiocarbamate,
o-ethyl-N-2-(4-methylpyrimidyl) monothiocarbamate,
o-ethyl-N-2-thiazolyl monothiocarbamate,
o-ethyl-N-2-(6-methoxybenzthiazolyl) monothiocarbamate, o-ethyl-N-5-thiadiazolyl-(1,2,4) monothiocarbamate,
o-ethyl-N-2-oxazolinonyl monothiocarbamate,
o-ethyl-N-(4,5,6,7-tetrachlorophthalimidomethyl) monothiocarbamate, and
o-ethyl-N-$\alpha,\beta$-dichlorosuccinimomethyl monothiocarbamate.

The chlorocarbonyl sulphene chloride which is used for the reaction may be obtained according to an earlier proposal of the applicants in the following manner: 210 ml. of concentrated $H_2SO_4$, 18 g. of water and 186 g. (1 mol.) of trichloromethyl sulphenyl chloride are heated with vigorous stirring to 45–50° C. Almost 2 mol. of HCl are split off after 1–1½ hours and the evolution of HCl subsides. The two layers resulting from the reaction are separated in a separating funnel. The light phase represents the crude products, which even at this stage have a high degree of purity. This phase can be further purified by distillation. The chlorocarbonyl sulphene chloride boils at 98° C./760 mm. Hg; $n_D^{20.5}=1.5158$.

The process is explained in the equation below using as example the reaction of o-butyl-N-methyl monothiocarbamate with chlorocarbonyl sulphene chloride:

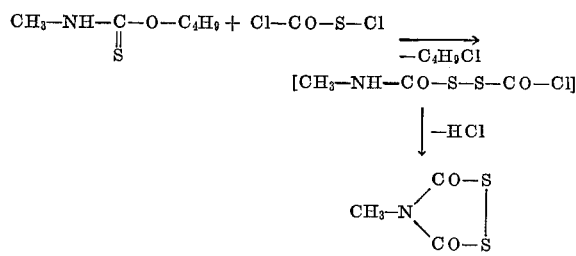

It is extremely surprising that the reaction does not stop at the disulphide stage which is to be expected, but that the ring closure to form the compounds according to the invention occurs smoothly under mild conditions. The reaction is preferably carried out in the presence of a diluent. When using solvents, one preferably uses those which do not react or only slowly react with the two reactants. Examples of such solvents include: hydrocarbons such as petroleum ether, light petroleum fractions, pentane, hexane, isooctane, benzene, toluene, xylene, chlorinated hydrocarbons such as methylene chloride, dichloroethane, chloroform, carbon tetrachloride, chlorobenzene, dichlorobenzene, ethers such as tetrahydrofuran, dibutyl ether, dioxane or diphenyl ether, and also any appropriate mixtures of the said solvents.

The reaction temperature can be varied within wide limits. A temperature between approximately 0 and 100° C. is usually used, preferably one between 20 and 40° C.

The duration of the reaction is about 30 minutes to about 10 hours, and advantageously 1 to 5 hours.

The reactants are generally used in approximately equimolar proportions. An acid-binding agent can be added, but this is not necessarily so. When working in the presence of acid-binding agents, these are used in quantities up to about 1.1 mol. equivalent, based on the hydrogen chloride being liberated. As acid-combining agents, there are preferably used those organic or inorganic bases which are usually employed e.g., tertiary organic amines such as triethylamine, tributylamine, N,N-diethylaniline, N,N-dimethyl benzylamine, pyridine or quinoline and, as inorganic bases, $Na_2CO_3$, $K_2CO_3$, $NaHCO_3$ or MgO.

The reaction can for example be carried out by adding chlorocarbonyl sulphene chloride dropwise to a solution of a thiomonocarbamate, and working up the product in the usual way after the evolution of gas has ended. The new compounds are usually obtained in crystalline form. They are valuable intermediate products for the preparation of plant-protection agents.

In addition, the compounds themselves have an insecticidal action. Thus, fruit flies (*Drosophila melanogaster*) are 100% killed by N-methyl-3,5-dioxo-1,2,4-dithiazolidine when used in a quantity of 0.2% (0.2% solution of the active substance in dimethyl formamide). Aphides are also completely destroyed by the N-phthalimidomethyl derivative when used in the same quantity. Furthermore, larvae of *Phaedon cochleariae* are 95% destroyed by the N-3,4-dichlorophenyl derivative. The other compounds obtainable by the process show a similar action.

EXAMPLE 1

26 g. of chlorocarbonyl sulphene chloride (0.2 mol.) are added dropwise at 20–30° C. to a solution of 29 g. of o-butyl-N-methyl monothiocarbamate (0.2 mol.) in 100 ml. of dioxane and, when the reaction subsides, 20 g. of triethylamine (0.2 mol.) are also added dropwise. The solution is stirred for another 10 minutes at room temperature, is then filtered with suction and concentrated in vacuo. The oily residue is distilled under high vacuum. There are obtained 20 g. of N-methyl-3-, 5-dioxo-1,2,4-dithiazolidine of the formula

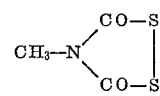

of B.p. 80° C./0.2 mm. Hg.

Crystallisation occurs after the distillate has been triturated. M.P.: 38–39° C.

In similar manner, there are obtained

| | Yield |
|---|---|
| $C_4H_9$—N(CO—S)(CO—S) | B.P.: 90–92° C./0.15 torr — 83% of the theoretical. |
| $C_{12}H_{25}$—N(CO—S)(CO—S) | M.P.: 37–38° C — 69% of the theoretical. |
| $CH_3$—C₆H₄—N(CO—S)(CO—S) | M.P.: 165–166° C — 72% of the theoretical. |

EXAMPLE 2

26 g. chlorocarbonyl sulphene chloride (0.2 mol.) are added dropwise at a temperature below 40° C. to a solution of 29 g. of o-ethyl-N-allyl monothiocarbamate (0.2 mol.) in 150 ml. of dioxane. After the exothermic reaction has ended, 20 g. of triethylamine (0.2 mol.) are added and the solution is then filtered off with suction from the triethyl ammonium chloride and concentrated. The oily residue is triturated with carbon tetrachloride and the crystalline fractions filtered off with suction. 8 g. of N-allyl-3,5-dioxo-1,2,4-dithiazolidine of the formula

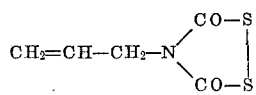

of B.P. 80–81° C./0.2 mm. Hg, are obtained.

The same compound is obtained if the 29 g. of o-ethyl-N-allyl monothiocarbaminate are replaced by the equivalent quantity of o-dodecyl-N-allyl monothiocarbamate.

EXAMPLE 3

14 g. of chlorocarbonyl sulphene chloride (0.11 mol.) are added dropwise at 20–30° C. to a solution of 18 g. of o-ethyl-N-phenyl monothiocarbamate (0.1 mol.) in 150 ml. of dioxane. The mixture is stirred at room temperature until evolution of gas has ceased. Concentration is carried out in vacuo and the product is precipitated with petroleum ether. There are obtained 15 g. of N-phenyl-3,5-dioxo - 1,2,4 - dithiazolidine of M.P.: 168–169° C.

The following compound is obtained in similar manner:

| | Yield |
|---|---|
| Ph-CH$_2$-N(CO-S)(CO-S) | M.P.: 93–94° C __ 35% of the theoretical. |

EXAMPLE 4

14 g. of chlorocarbonyl sulphene chloride (0.11 mol) are introduced at 30–40° C. into a solution of 25 g. of o-ethyl-N - 3,4 - dichlorophenyl monothiocarbamate (0.1 mol) in 150 ml. of dioxane followed by 10 g. of triethylamine (0.1 mol). Stirring is continued for 1 hour at room temperature, followed by suction filtration. The filtrate is then concentrated by evaporation. The solid residue is taken up in dioxane and the product is precipitated with petroleum ether. 22 g. of N-3,4-dichlorophenyl-3,5-dioxo-1,2,4-dithiazolidine of M.P.: 160–161° C. are obtained.

The following compounds are obtained in similar manner:

| Compound | Yield |
|---|---|
| Cl-C$_6$H$_4$-N(CO-S)(CO-S) | M.P.: 170–171° C _____ |
| Phthalimido-N-CH$_2$-N(CO-S)(CO-S) | M.P.: 152° C _____ |
| CH$_3$-O-CH$_2$-CH$_2$-CH$_2$-N(CO-S)(CO-S) | B.P.: 112–113° C./0.2 mm. Hg _____ 63% of the theoretical. |
| cyclohexyl-N(CO-S)(CO-S) | M.P.: 87–88° C _____ 41% of the theoretical. |
| Ph-O-CH$_2$-CH$_2$-N(CO-S)(CO-S) | Highly viscous oil _____ 75% of the theoretical. |
| Br-C$_6$H$_4$-N(CO-S)(CO-S) | M.P.: 109–110° C _____ 41% of the theoretical. |
| 3-Cl-4-CH$_3$O-C$_6$H$_3$-N(CO-S)(CO-S) | M.P.: 183–184° C _____ 70% of the theoretical. |
| O$_2$N-C$_6$H$_4$-N(CO-S)(CO-S) | M.P.: 169–170° C with (decomposition) ____ 41% of the theoretical. |
| naphthyl-N(CO-S)(CO-S) | M.P.: 199–200° C _____ 58% of the theoretical. |
| morpholino-N-N(CO-S)(CO-S) | M.P.: 134° C. (with decomposition) _____ 53% of the theoretical. |
| benzothiazolyl-N(CO-S)(CO-S) | M.P.: 250° C. (with decomposition) _____ 27% of the theoretical. |

EXAMPLE 5

14 g. of chlorocarbonyl sulphene chloride (10% excess) are added dropwise at 30–40° C. to a solution of 18 g. of o-ethyl-N-2-pyridyl monothiocarbamate (0.1 mol) in 150 ml. of dioxane. The hydrochloride of the described compound precipitates as an oil. It is then decanted off from the supernatant solution. The oil is dissolved in 100 ml. of water, the solution is mixed with 100 ml. of chloroform and 8 g. of sodium bicarbonate are added to the mixture while stirring briskly. The layers are separated, the organic phase is washed with water, dried with sodium sulphate and the solvent is removed. The residue which was at first oily, crystallises on standing. After dissolving the product in benzene and allowing it to crystallise from benzene, there are obtained 5 g. of N-2-pyridyl-3,5-dioxol-2,4-dithi-azolidine of the formula

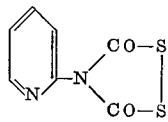

M.P.: 147 to 149° C.

What is claimed is:

1. A process for producing substituted 3,5-dioxo-1,2,4-dithiazolidines which comprises contacting chlorocarbonyl sulphenyl chloride with about an equimolar amount of a compound of the formula

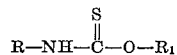

wherein

R is a member selected from the group consisting of hydrogen, alkyl, lower alkenyl, dicarboxylic acid iminomethyl, cycloalkyl, aryl and a heterocyclic moiety having 5–7 ring members and 1–3 hetero atoms selected from the group consisting of oxygen, sulfur and nitrogen, and in which $R_1$ is a hydrocarbon of about 1–18 carbon atoms or a benzyl radical; effecting the reaction at a temperature of about 0–100° C.

2. A process of claim 1 wherein the reaction is carried out in the presence of a diluent.

3. A process of claim 1 wherein the reaction is carried out in the presence of a substantially inert solvent.

4. The process of claim 1 wherein the reaction is effected at a temperature of about 20–40° C.

5. The process of claim 1 wherein the reaction is effected in the presence of an active amount of an acid binding agent.

No references cited.

ALEX MAZEL, Primary Examiner

J. TOVAR, Assistant Examiner

U.S. Cl. X.R.

260—294.8, 305, 306.7; 424—248